United States Patent
De Mulder et al.

(10) Patent No.: US 11,914,870 B2
(45) Date of Patent: Feb. 27, 2024

(54) SIDE-CHANNEL-ATTACK-RESISTANT MEMORY ACCESS ON EMBEDDED CENTRAL PROCESSING UNITS

(71) Applicant: CRYPTOGRAPHY RESEARCH, INC., San Jose, CA (US)

(72) Inventors: Elke De Mulder, Kirkland, WA (US); Michael Hutter, Vienna (AT); Samantha Gummalla, Dublin, CA (US)

(73) Assignee: CRYPTOGRAPHY RESEARCH, INC., San Jose, CA (US)

( * ) Notice: Subject to any disclaimer, the term of this patent is extended or adjusted under 35 U.S.C. 154(b) by 115 days.

(21) Appl. No.: 17/435,360

(22) PCT Filed: Mar. 4, 2020

(86) PCT No.: PCT/US2020/021019
§ 371 (c)(1),
(2) Date: Aug. 31, 2021

(87) PCT Pub. No.: WO2020/181002
PCT Pub. Date: Sep. 10, 2020

(65) Prior Publication Data
US 2022/0147251 A1    May 12, 2022

Related U.S. Application Data

(60) Provisional application No. 62/814,169, filed on Mar. 5, 2019.

(51) Int. Cl.
*G06F 3/06* (2006.01)

(52) U.S. Cl.
CPC .......... *G06F 3/0623* (2013.01); *G06F 3/0655* (2013.01); *G06F 3/0679* (2013.01)

(58) Field of Classification Search
USPC ........................................ 711/154
See application file for complete search history.

(56) References Cited

U.S. PATENT DOCUMENTS 5,317,947 A * 6/1994 Miyata ................... G10H 1/186
84/622
9,128,876 B2    9/2015 Cordella et al.
(Continued)

FOREIGN PATENT DOCUMENTS

GB        2438972 A    12/2007

OTHER PUBLICATIONS

David Kaplan et al. "AMD Memory Encryption" Apr. 21, 2016 white paper Advanced Micro Devices, Inc. 12 pages.
Notification of Transmittal of the International Search Report and the Written Opinion of the International Searching Authority, or the Declaration with dated Jun. 22, 2020 re: Int'l Appln. No. PCT/US2020/021019. 13 Pages.
Sami Saab et al. "Side-Channel Protections for Cryptographic Instruction Set Extensions" IACR Cryptology ePrint Archive 2016, 12 pages.

(Continued)

*Primary Examiner* — Hashem Farrokh
(74) *Attorney, Agent, or Firm* — Lowenstein Sandler LLP

(57) ABSTRACT

Aspects of the present disclosure calculate masked data shares dynamically inside the CPU boundary, and use a plurality of memory channels to write the masked data shares to an external memory location and/or to read the data shares from that external memory location. Each dynamically generated mask value is uniquely associated with a corresponding memory channel during writing data to the external memory. The modified masked data is unmasked or remasked during a subsequent read operation.

20 Claims, 5 Drawing Sheets

(56) References Cited

U.S. PATENT DOCUMENTS

| | | | |
|---|---|---|---|
| 2007/0221724 A1* | 9/2007 | Kanai | G06F 11/1016 |
| | | | 235/382 |
| 2011/0078457 A1* | 3/2011 | Starr | H04L 9/0897 |
| | | | 713/189 |
| 2013/0145177 A1 | 6/2013 | Cordella et al. | |
| 2014/0223239 A1* | 8/2014 | Mittal | G06F 11/0787 |
| | | | 714/42 |
| 2015/0082435 A1 | 3/2015 | Roussellet et al. | |
| 2016/0127123 A1 | 5/2016 | Johnson | |
| 2016/0328567 A1* | 11/2016 | Chang | G06F 21/85 |
| 2017/0288855 A1 | 10/2017 | Kumar et al. | |
| 2018/0300059 A1* | 10/2018 | Nakamura | G06F 8/654 |
| 2019/0050204 A1* | 2/2019 | Hutter | G06F 7/588 |

OTHER PUBLICATIONS

Thomas Unterluggauer et al. "MEAS:memory encryption and authentication secure against side-channel attacks" Journal of Cryptographic Engineering Received: Jun. 14, 2017 / Accepted: Jan. 11, 2018 https://doi.org/10.1007/s13389-018-0180-2. 22 pages.

EP Extended European Search Report with dated Apr. 8, 2022 re: EP Appln. No. 20766823.7. 8 pages.

EP Response filed Nov. 4, 2022 in Response to the Extended European Search Report dated Apr. 8, 2022 and the Communication Pursuant to Rules 70(2) and 70a(2) EPC dated Apr. 26, 2022 re: EP Appln. No. 20766823.7. 23 pages.

* cited by examiner

SIDE-CHANNEL-ATTACK-RESISTANT MEMORY ACCESS ON EMBEDDED CENTRAL PROCESSING UNITS

BRIEF DESCRIPTION OF THE DRAWINGS

The present disclosure will be understood more fully from the detailed description given below and from the accompanying drawings of various implementations of the disclosure.

DETAILED DESCRIPTION

Figure 1:
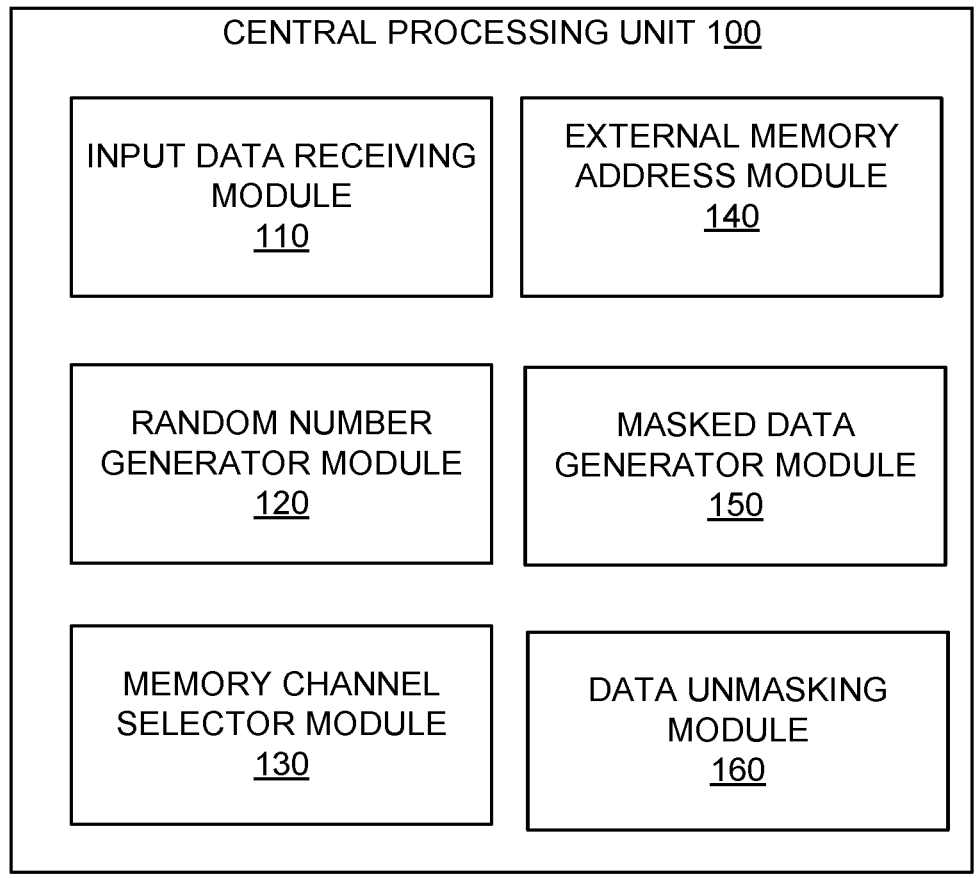
FIG. 1 is a block diagram of the components of an embedded central processing unit (CPU) in accordance with some embodiments.

Aspects of the present disclosure are directed to secure exchange of masked data between an embedded central processing unit (CPU) and an external memory during cryptographic operations. An integrated circuit having the embedded CPU may perform a cryptographic operation that may result in susceptibility of the integrated circuit to a side-channel analysis (SCA) attack where an attacker (e.g., an unauthorized entity) may obtain information as the cryptographic operation is performed. An example of a side-channel attack includes, but is not limited to, Differential Power Analysis (DPA) where the attacker who seeks to obtain a secret key used in the cryptographic operation may study the differences in power profile (i.e., power consumption patterns) of the integrated circuit as the cryptographic operation is performed. An attacker may be an unauthorized entity that may obtain the input (e.g., the secret key) to the cryptographic operation by analyzing power profile measurements of the integrated circuit over a period of time. Accordingly, when the sender transmits a ciphertext to a receiver by encrypting plaintext via a cryptographic operation, the attacker may be able to retrieve the secret key that is used to encrypt the plaintext to the ciphertext by observing the power profile of the integrated circuit as the cryptographic operation is performed to encrypt the plaintext into the ciphertext. For example, the attacker may uncover a cryptographic (e.g., secret or private) key that is used to encrypt the plaintext as the cryptographic operation is performed by the integrated circuit.

A key part of protecting embedded CPUs during a cryptographic operation is to protect the communication path from the CPU to the external memory (e.g., static Random Access Memory (SRAM) or other types of memory outside of the CPU) and vice versa. One way to protect the communication path is to use a masking technique to obfuscate the original data during CPU to memory communication. Masking may be implemented by Boolean or arithmetic techniques, both of which require splitting up the masked data into two or more shares. Each share is then independent of the original data and can be processed and stored individually without leaking information in side-channels. If the masked data is loaded to the CPU from external memory, the shares can be re-combined to reveal the original data again. This solution, however, incurs high overhead, because more external memory resource is required to store the two or more shares.

Aspects of the present disclosure address the above and other deficiencies by calculating masked data shares dynamically inside the CPU boundary (i.e., a trust boundary within which possibility of data leakage is minimal), and using a plurality of memory channels to write the masked data shares to an external memory location and/or to read the data shares from that external memory location. Each dynamically generated mask value is uniquely associated with a corresponding memory channel during writing data to the external memory. The modified masked data is unmasked during a subsequent read operation, and the unmasked data can be remasked again with a new mask, if necessary.

Note that in the specification, "dynamically" means substantially at the same time or without a perceptible delay ("on-the-fly"). In the context of computer operations, "dynamically" may mean during the running of a computer operation without interrupting the flow of the operation. Additionally, in this disclosure, Boolean operations (such as exclusive OR (XOR)) are shown as examples of masking techniques, though the scope of the disclosure is not limited to just Boolean masking. For example, pure arithmetic operation or a combination of Boolean and arithmetic operations, with appropriate mask conversions as necessary, is within the scope of this disclosure.

Advantages of the disclosed approach include prevention of data value leakage and/or data update/overwrite leakage inside the external memory and on the memory bus. The approach is also secure against microarchitecture-specific leaks (e.g., share cross-domain leaks, combination leaks, etc.).

An additional advantage of the approach disclosed herein is that the approach is agnostic of memory technology. For example, the methods are equally applicable to FPGA Block RAM, ASIC RAM macro cells, registers and any other type of memory technology. Furthermore, there is no significant impact on latency of the CPU performance, while the overall implementation cost decreases because of zero overhead on external memory resource.

FIG. 1 illustrates an example CPU including a masked output generator module, in accordance with some aspects of the present disclosure. The CPU 100 may include internal memory (not shown) and various components/modules 110-160 used for cryptographic operations. Examples of such cryptographic operations include, but are not limited to, generating a digital signature to authenticate an integrated circuit containing an embedded CPU. Specific examples of types of cryptographic operations may be based on, but are not limited to, Secure Hash Algorithm (SHA)-1, SHA-2, Advanced Encryption Standard (AES), Data Encryption Standard (DES), etc.

As shown in FIG. 1, the CPU 100 may include, among other things, an input data receiving module 110, a random number generator module 120, a memory channel selector module 130, an external memory address module 140, a masked data generator module 150 and a data unmasking module 160. In alternative embodiments, the functionality of one or more of the modules may be combined or divided.

The masked data generator module 150 and data unmasking module 160 may be implemented by or in processing logic that may include hardware (e.g., processing device, circuitry, dedicated logic, programmable logic, microcode, integrated circuit, hardware of a device, etc.), software (e.g., instructions run or executed on a processing device), or a combination thereof.

The input data receiving module 110 may receive shares corresponding to an input data value. Note that the input data value may already be masked with an initial mask. For example, an underlying secret input data value 'd' may be already masked by combining the value 'd' with an initial mask 'm1'. The combination of the value 'd' with the mask m1 may be the first share (d⊕m1). The mask value m1 itself may be the second share. Additional random numbers generated by the random number generator module 120 may be added to the secret value 'd' already masked with the first mask value 'm1' within the CPU boundary, as further elaborated with reference to FIG. 2. The external memory address module 140 can maintain a table of memory addresses (e.g., all memory addresses) corresponding to the various memory locations in the external memory 240 shown in FIG. 2. Each memory location may be addressable by a plurality of memory channels. The memory channel selector module 130 can select which memory channel is to be used to write data into a specific memory location with a specific memory address. The mask generator module 150 can be used to dynamically calculate a masked value to generate masked data (d⊕m2) sent to the input data port 242 to be written into the external memory 240. The data unmasking module 160 can read the masked data (d⊕m2) from the output data port 238 of the external memory 240, and retrieve original data within the CPU boundary.

Figure 2:
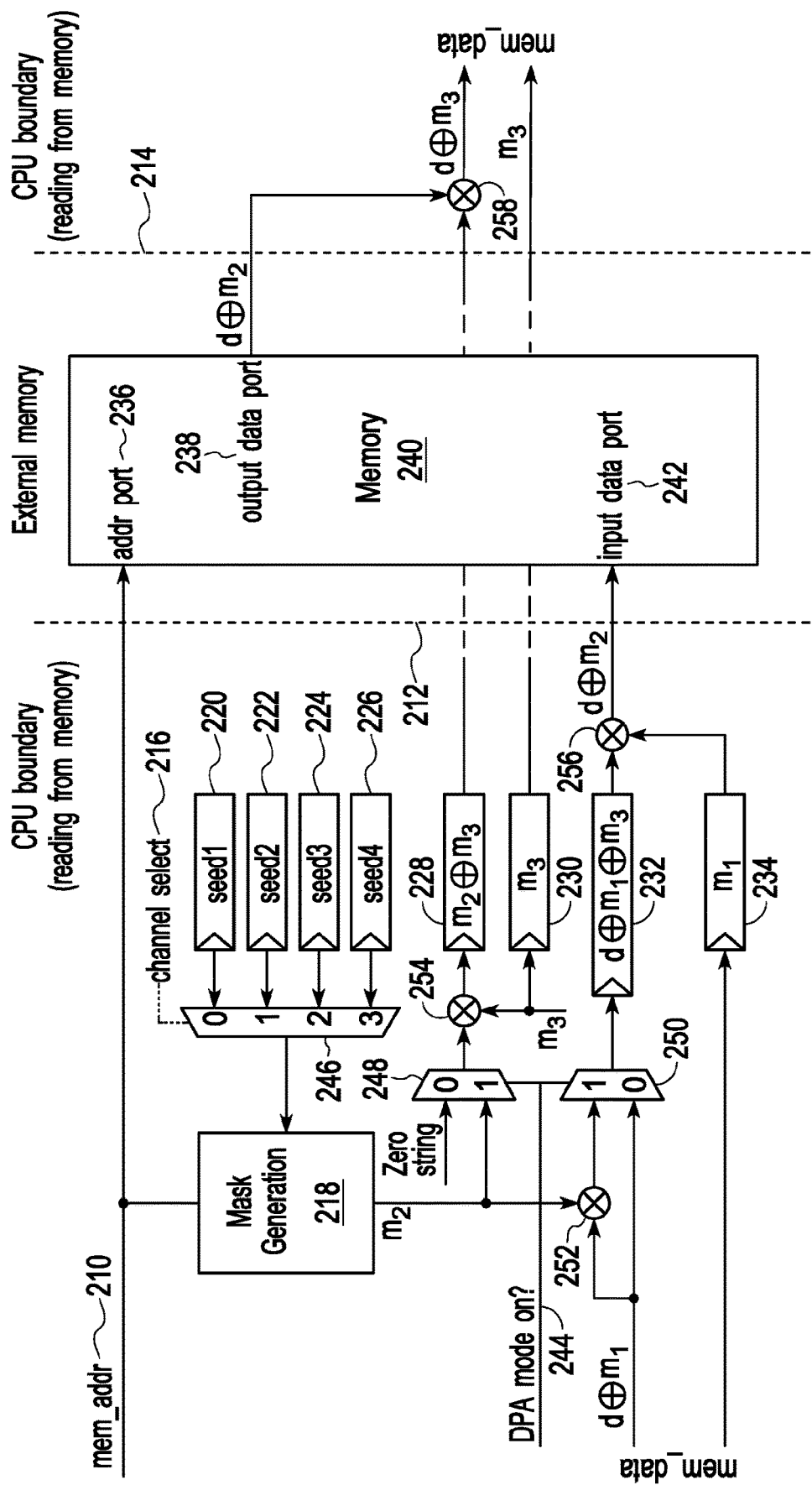
FIG. 2 is an example implementation of mask generation for side-channel attack resistant cryptographic operation, in accordance with embodiments of the present disclosure.

FIG. 2 details an example implementation of dynamically generating channel-specific mask values (m2) within the CPU boundary (shown by the dashed line 212 for writing to external memory 240) by the mask generation sub-component 218 (whose function may be performed by the masked data generator module 150 in FIG. 1). The mask generation sub-component 218 can receive the address (mem_address 210) of the memory location where masked data is to be written. The mask generation sub-component 218 can also receive information from the multiplexer 246 about what memory channel is to be used to write data. In the example illustrated in FIG. 2, four memory channels (0, 1, 2, 3) are shown that can be processed by the multiplexer 246 based on the channel select command 216, though any arbitrary number of channels may be used. Each channel is associated with a unique seed value (seed 1, seed 2, seed 3 and seed 4) stored in the corresponding registers 220, 222, 224 and 226. A corresponding mask value is calculated for each of the channels.

The mask value can be a function 'f' of the known memory address (communicated via address port 236) and the unique seed value, i.e., $mask_i = f(memory\ address, seed_i)$, where 'i' is the index of each of the plurality of memory channels corresponding to the memory address associated with a specific memory location. The seed values can be generated by a random number generator within the CPU boundary to make it difficult for a side-channel attack, as knowing only the memory address is not sufficient to reveal the mask value. The channels can be reseeded, i.e. the seed values may be refreshed periodically or randomly. Reseeding can happen at different rates to improve the security of the implementation (e.g., key schedule v. crypto primitive, or CBC state v. internal crypto primitive state). The memory channel switch method described here is an efficient way to achieve a high level of security with less frequent reseeding. Note that the dynamically generated mask value 'm2' shown in FIG. 2 does not necessarily indicate mask value calculated for channel 2, but represents mask value calculated for whichever channel is selected.

The embodiment illustrated in FIG. 2 also shows that the side-channel resistance mode (e.g., the DPA mode) can be turned on or off using a dedicated Instruction Set Extension (ISE) or a Control Status Register (CSR) sending a signal 244 to the multiplexer 248 and multiplexer 250. When DPA mode is on, the dynamically generated mask value m2 can be used for subsequent XOR operations 252 and 254.

When the DPA mode is on, the dynamically generated mask value m2 can be combined with the first masked share (d⊕m1) of the input data by an XOR operation 252, the result of which (d⊕m1⊕m2) can be saved in register 232. Another XOR operation 256 involving the result saved at 232 and the other input share m1 (saved at register 234) can generate the dynamically modified masked data (d⊕m2) that is sent to the input data port 242 of the external memory 240 to be written at the targeted memory location. The target memory location can be addressed by the selected memory channel (which is not a physical channel) associated with calculated mask value m2.

In the embodiment shown in FIG. 2, an additional mask (m3) is generated within the CPU boundary to eventually retrieve the original secret value which is masked with m2 during writing. In some implementations, the additional mask value m3 is not channel specific, but rather a random value generated within the CPU boundary. At XOR operation 254, when the DPA mode is on at multiplexer 248, the dynamically generated channel-specific mask value m2 can be combined with m3. The two shares of the XOR operation 254 (m3⊕m2) can be saved in register 228 and m3 itself can be saved in register 230. Knowing m3 enables the unmasking of the modified masked data (d⊕m2).

For reading operations within the CPU boundary (indicated by dashed line 214), saved modified masked data (d⊕m2) can be accessed from output data port 238 of the external memory 240, and an XOR operation 258 can be performed to generate shares (d⊕m3) and m3. Thus, the original value of d can be retrieved.

Figure 3:
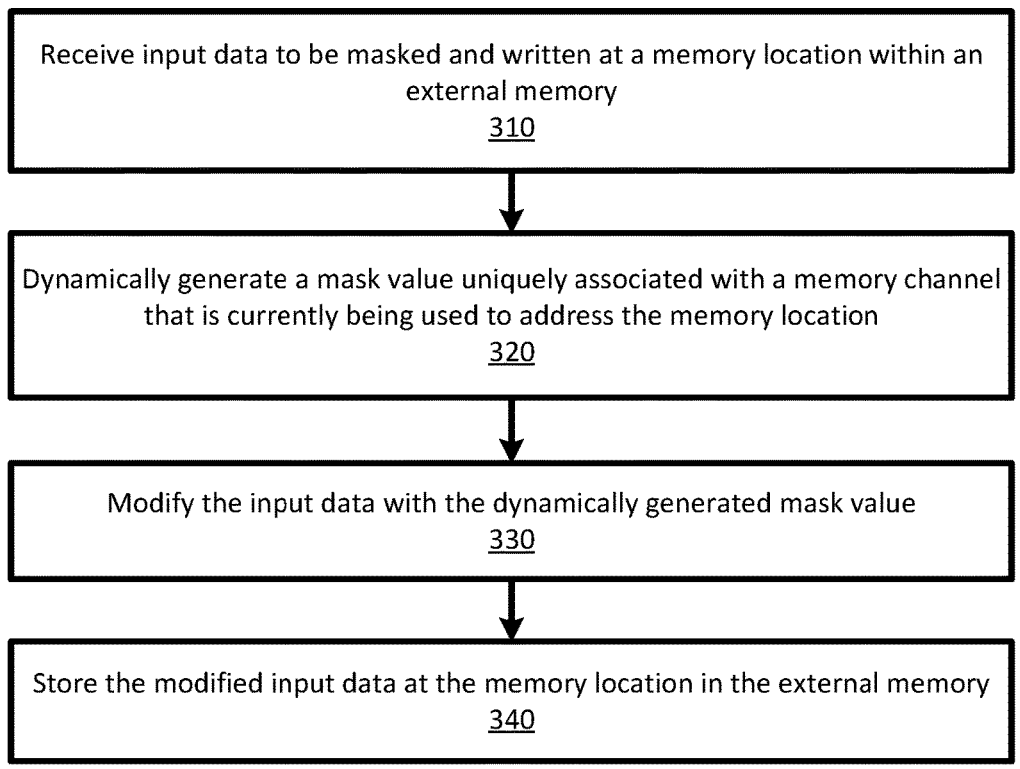
FIG. 3 is a flow diagram of an example method to write data to an external memory location, in accordance with some embodiments of the present disclosure.

FIG. 3 is a flow diagram of an example method 300 to perform a SCA-resistant data transfer between a CPU and an external memory during writing. The method 300 may be performed by processing logic that may include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 300 may be performed by the components of CPU 100 shown in FIG. 1.

Referring back to FIG. 3, method 300 begins at block 310, where input data is received at the CPU. The input data is to be masked and written at an external memory location. Input data may be received at the input data receiving module 110 of the CPU 100, shown in FIG. 1. Input data may be already masked. Also, input data may be received in the form of a plurality of shares for further cryptographic operations. For example, in FIG. 2, the two input shares that are received are (d⊕m1) and m1, where m1 is an initial mask. Input data can be further masked before writing.

At block 320, a mask value is dynamically generated within the CPU boundary. The dynamically generated mask value m2 can be uniquely associated with the memory channel that is currently being used to address the memory location where the modified input data is to be written. As described above, m2 can be calculated as a function of the memory address and a unique seed value for the selected channel. The seed value can be a random number that may be generated by the random number generator module 120. In an alternative embodiment, the random number may also be stored within an internal memory (not shown in FIG. 1) within the CPU.

At block 330, the input data is modified with the dynamically generated mask value m2. This can be performed by the masked data generator module 150 in FIG. 1. In FIG. 2, this operation is shown as the XOR operation 256.

At block 340, the modified input data is stored in the external memory location. The modified input data can be communicated to the input data port 242 shown in FIG. 2. Note that during the sequence of operations performed within the CPU boundary, each of the intermediate values or any combination of intermediate values is statistically independent of the underlying secret value. Therefore, no direct-value leak is expected. Additionally, because the mask value m2 is dynamically generated based on which memory channel is currently being used, the modified masked value that is communicated outside of the CPU boundary 212 to the external memory 240 also keeps changing, thereby preventing possibility of information leakage during communication.

Figure 4:
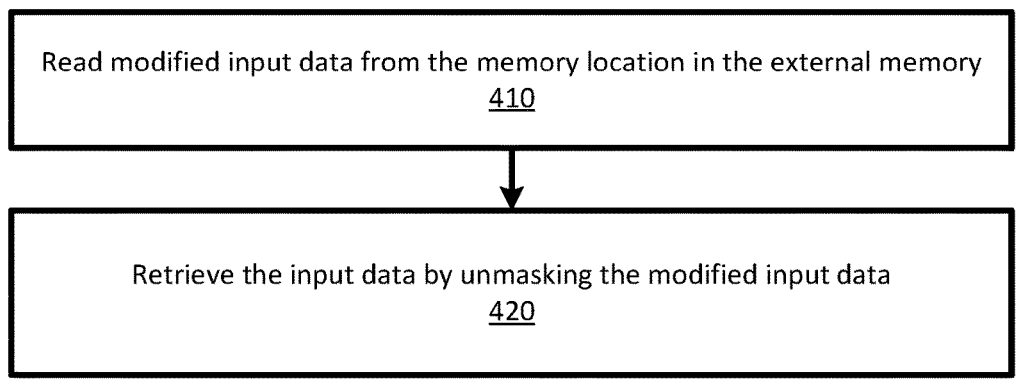
FIG. 4 is a flow diagram of an example method to read data from an external memory location, in accordance with some embodiments of the present disclosure.

FIG. 4 is a flow diagram of an example method 400 to perform a SCA-resistant data transfer between an external memory and a CPU during reading. The method 400 may be performed by processing logic that may include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 300 may be performed by module 160 of CPU 100 shown in FIG. 1.

Referring back to FIG. 4, method 400 begins at block 410, where the saved modified input data (e.g., data masked with the dynamically generated mask value m2) is read from the external memory location.

At block 420, the input data is retrieved by unmasking the modified input data. In the example embodiment illustrated in FIG. 2, the unmasking operation is shown as the XOR operation 258. The additional mask m3 generated within the CPU boundary and combined with the dynamically generated mask m2 by the XOR operation 254 helps removing m2 during XOR operation 258. The output of the XOR operation 258 may be in the form of a plurality of data shares (e.g., one share is (d⊕m3) and the other share is m3). The shares can be used within the CPU boundary for further cryptographic operations.

Note that though not shown in FIG. 4, the unmasking operations may be replaced by the remasking of the revealed data (or data shares) with another mask.

Persons skilled in the art will understand that although the flow diagrams in FIGS. 3 and 4 show a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

Figure 5B:
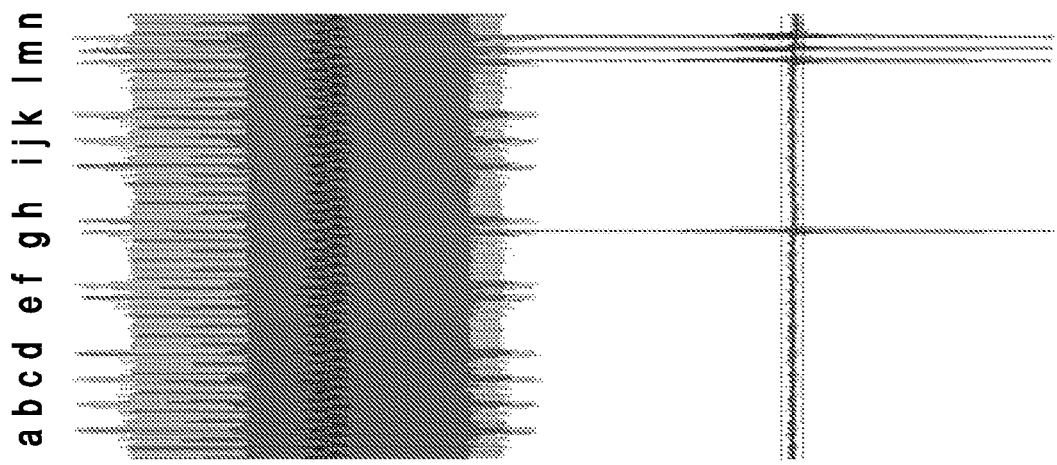
FIGS. 5A and 5B illustrate performance improvement against side-channel attack achieved by embodiments of the present disclosure.
Figure 5A:
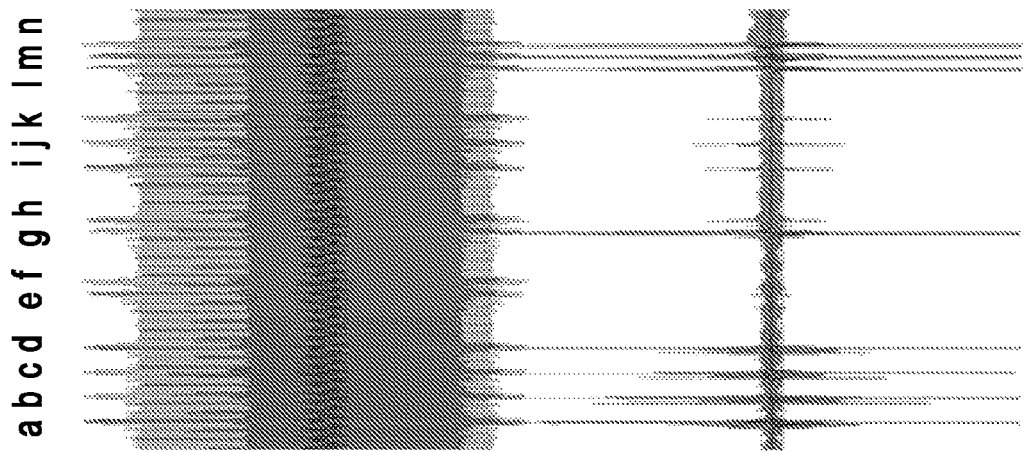

FIGS. 5A-5B compare the performance of side-channels when the DPA protection scheme is off versus when the DPA protection scheme is off, according to some embodiments. The side-channels are marked a, b, c, . . . l, m, n. FIG. 5A shows 1.5 million power traces collected from unprotected (i.e. DPA protection off) side channels, showing prominent leakage from several channels. FIG. 5B shows 3 million power traces collected from protected (i.e. DPA protection on) side channels, showing leakage from only a few expected channels. As shown in FIG. 2, the DPA protection scheme may be turned on or off by the command 244 sent to multiplexers 248 and 250.

Figure 6:
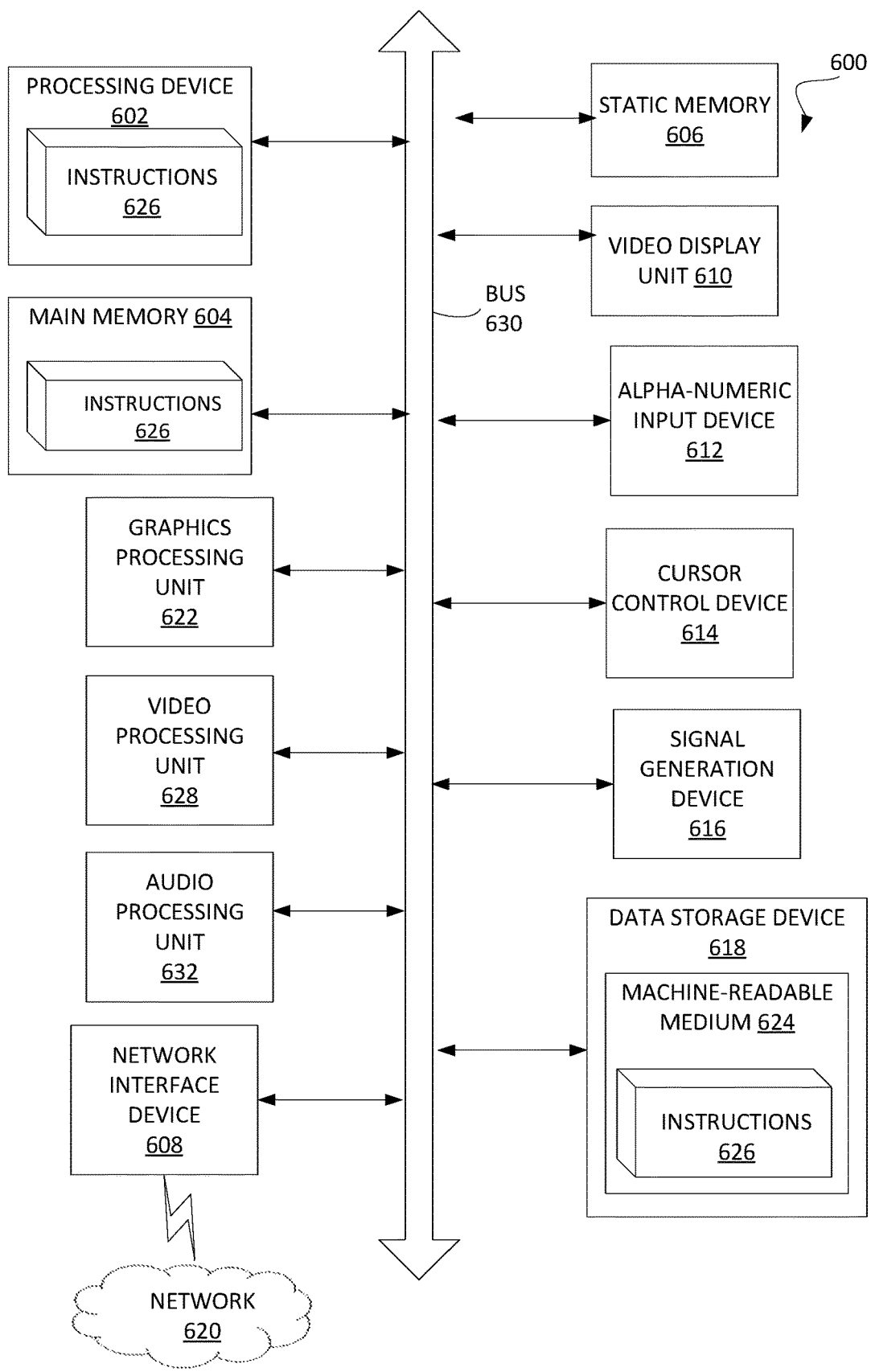
FIG. 6 illustrates a block diagram of a sample computer system in which some embodiments of the disclosure may operate.

FIG. 6 illustrates an example machine of a computer system 600 within which a set of instructions, for causing the machine to perform any one or more of the methodologies discussed herein, may be executed. In alternative implementations, the machine may be connected (e.g., networked) to other machines in a LAN, an intranet, an extranet, and/or the Internet. The machine may operate in the capacity of a server or a client machine in client-server network environment, as a peer machine in a peer-to-peer (or distributed) network environment, or as a server or a client machine in a cloud computing infrastructure or environment.

The machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 600 includes a processing device 602, a main memory 604 (e.g., read-only memory (ROM), flash memory, dynamic random access memory (DRAM) such as synchronous DRAM (SDRAM) or Rambus DRAM (RDRAM), etc.), a static memory 606 (e.g., flash memory, static random access memory (SRAM), etc.), and a data storage device 618, which communicate with each other via a bus 630. In one implementation, processing device 602 may be an embedded CPU 100 in FIG. 1, and memory 606 may be external memory 240 shown in FIG. 2.

Processing device 602 represents one or more general-purpose processing devices such as a microprocessor, a central processing unit, or the like. More particularly, the processing device may be complex instruction set computing (CISC) microprocessor, reduced instruction set computing (RISC) microprocessor, very long instruction word (VLIW) microprocessor, or processor implementing other instruction sets, or processors implementing a combination of instruction sets. Processing device 602 may also be one or more special-purpose processing devices such as an application specific integrated circuit (ASIC), a field programmable gate array (FPGA), a digital signal processor (DSP), network processor, or the like. The processing device 602 is configured to execute instructions 626 for performing the operations and steps discussed herein.

The computer system 600 may further include a network interface device 608 to communicate over the network 620. The computer system 600 also may include a video display unit 610 (e.g., a liquid crystal display (LCD) or a cathode ray tube (CRT)), an alphanumeric input device 612 (e.g., a keyboard), a cursor control device 614 (e.g., a mouse), a graphics processing unit 622, a signal generation device 616 (e.g., a speaker), graphics processing unit 622, video processing unit 628, and audio processing unit 632.

The data storage device 618 may include a machine-readable storage medium 624 (also known as a computer-readable medium) on which is stored one or more sets of instructions or software 626 embodying any one or more of the methodologies or functions described herein. The instructions 626 may also reside, completely or at least partially, within the main memory 604 and/or within the processing device 602 during execution thereof by the computer system 600, the main memory 604 and the processing device 602 also constituting machine-readable storage media.

In one implementation, the instructions 626 include instructions to implement functionality corresponding to a masked output generator module 160 of FIG. 1. While the machine-readable storage medium 624 is shown in an example implementation to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "identifying" or "determining" or "executing" or "performing" or "collecting" or "creating" or "sending" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct a more specialized apparatus to perform the method. The structure for a variety of these systems will appear as set forth in the description below. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing specification, implementations of the disclosure have been described with reference to specific example implementations thereof. It will be evident that various modifications may be made thereto without departing from the broader spirit and scope of implementations of the disclosure as set forth in the following claims. The specification and drawings are, accordingly, to be regarded in an illustrative sense rather than a restrictive sense.

What is claimed is:

1. A computer-implemented method comprising:
receiving, at a central processing unit (CPU), input data that is to be masked and written at a memory location within an external memory coupled to the CPU, wherein the memory location is addressable by a plurality of memory channels;
dynamically generating, within a boundary of the CPU, a mask value uniquely associated with a memory channel of the plurality of memory channels that is currently being used to address the memory location, wherein the mask value is a function of a memory address of the memory location and a unique seed value corresponding to the memory channel that is currently being used; and
prior to writing at the memory location within the external memory, modifying, within the boundary of the CPU, the input data by masking the input data with the dynamically generated mask value.

2. The method of claim 1, further comprising: calculating a plurality of mask values, each mask value of the plurality of mask values being uniquely associated with a respective memory channel, wherein each mask value is a function of a memory address of the memory location and a unique seed value corresponding to the respective memory channel.

3. The method of claim 2, wherein the unique seed value is randomly generated to make the respective memory channel protected against an attack based on differential power analysis (DPA).

4. The method of claim 2, wherein the unique seed value is refreshed periodically for reseeding the respective memory channel.

5. The method of claim 2, wherein the function is a pseudo-random function (PRF).

6. The method of claim 5, wherein the function is implemented using a cryptographic primitive.

7. The method of claim 6, wherein the cryptographic primitive comprises at least one of a block cipher, a stream cipher, or a hash function.

8. The method of claim 2, wherein the function generates a diffused output that is used as a mask value.

9. The method of claim 1, further comprising:
storing the modified input data at the memory location within the external memory.

10. The method of claim 9, further comprising:
reading the stored modified input data from the memory location within the external memory.

11. The method of claim 10, further comprising:
retrieving, within the boundary of the CPU, the input data by unmasking the modified input data.

12. The method of claim 10, further comprising:
remasking, within the boundary of the CPU, the modified input data with an additional mask.

13. The method of claim 12, wherein the additional mask is generated by a pseudo-random number generator (PRNG).

14. The method of claim 1, wherein a memory channel can dynamically access a plurality of memory addresses.

15. The method of claim 1, wherein the input data and the modified input data comprise a plurality of shares suitable for cryptographic operations.

16. The method of claim 15, wherein the cryptographic operations comprise Boolean operations, arithmetic operations or a combination of Boolean and arithmetic operations.

17. The method of claim 1, wherein the input data comprises original data that has already been masked by an initial mask.

18. A system comprising:
an external memory; and
a CPU, operatively coupled with the external memory, to:
receive input data that is to be masked and written at a memory location within the external memory, wherein the memory location is addressable by a plurality of memory channels;
dynamically generate, within a boundary of the CPU, a mask value uniquely associated with a memory channel of the plurality of memory channels that is currently being used to address the memory location, wherein the mask value is a function of a memory address of the memory location and a unique seed value corresponding to the memory channel that is currently being used; and
prior to writing at the memory location within the external memory, modify, within the boundary of the CPU, the input data by masking the input data with the dynamically generated mask value.

19. The system of claim 18, wherein the CPU is further to:
retrieve, within the boundary of the CPU, the input data by unmasking the modified input data.

20. The system of claim 18, wherein the CPU is further to:
after reading the modified input data from the memory location within the external memory,
remask, within the boundary of the CPU, the modified input data with an additional mask.

* * * * *